(12) United States Patent
Payani et al.

(10) Patent No.: US 12,596,707 B2
(45) Date of Patent: Apr. 7, 2026

(54) STRUCTURED QUERY LANGUAGE GENERATION USING LARGE LANGUAGE MODELS

(71) Applicant: Cisco Technology, Inc., San Jose, CA (US)

(72) Inventors: Ali Payani, Santa Clara, CA (US); Ramana Rao V. R. Kompella, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/387,278

(22) Filed: Nov. 6, 2023

(65) Prior Publication Data

US 2025/0147956 A1    May 8, 2025

(51) Int. Cl.
*G06F 16/2452* (2019.01)
*G06F 16/242* (2019.01)

(52) U.S. Cl.
CPC .... *G06F 16/24522* (2019.01); *G06F 16/2433* (2019.01)

(58) Field of Classification Search
CPC ........................ G06F 16/24522; G06F 16/2433
USPC .......................................................... 707/722
See application file for complete search history.

(56) References Cited

U.S. PATENT DOCUMENTS

| | | | |
|---|---|---|---|
| 12,106,860 B1 * | 10/2024 | Guttikonda ............ | G16H 50/20 |
| 2008/0109212 A1 * | 5/2008 | Witbrock ............... | G06F 16/36 |
| | | | 707/999.005 |

| | | | |
|---|---|---|---|
| 2009/0077001 A1 * | 3/2009 | Macready ................ | G06N 5/02 |
| | | | 706/57 |
| 2019/0327271 A1 | 10/2019 | Saxena et al. | |
| 2020/0329143 A1 | 10/2020 | Copeland | |
| 2022/0172050 A1 * | 6/2022 | Dalli ...................... | G06N 3/047 |
| 2023/0185799 A1 | 6/2023 | Hoang et al. | |
| 2023/0259705 A1 | 8/2023 | Tunstall-Pedoe et al. | |
| 2023/0326212 A1 * | 10/2023 | Chawda ................. | G06V 10/82 |
| | | | 382/103 |
| 2024/0193399 A1 * | 6/2024 | Chen ......................... | G06N 3/08 |
| 2024/0248896 A1 * | 7/2024 | Boskovic .......... | G06F 16/24522 |
| 2024/0289545 A1 * | 8/2024 | Miller ..................... | G06F 40/20 |
| 2024/0296309 A1 * | 9/2024 | Mitra ....................... | G06N 3/08 |
| 2024/0362212 A1 * | 10/2024 | Sun .................. | G06F 16/24522 |
| 2025/0068919 A1 * | 2/2025 | Jarrett .................... | G06N 3/045 |
| 2025/0095641 A1 * | 3/2025 | Piskala .............. | G06F 16/3329 |

OTHER PUBLICATIONS

Eltaief A., "Contemporary Large Language Models LLMs", Kaggle, accessed on Oct. 30, 2023, 18 Pages.
Hacker News: "Giving GPT "Infinite" Knowledge", 2023, 11 Pages.

(Continued)

*Primary Examiner* — Cam Linh T Nguyen
(74) *Attorney, Agent, or Firm* — Lee & Hayes, P.C.

(57)    ABSTRACT

In one embodiment, a method herein comprises: inputting, by a device, an input prompt to a first large language model to generate an output; computing, by the device, a reward metric in part by using a solver to process the output; tuning, by the device and based on the reward metric, a second large language model configured to correct errors of the first large language model using reinforcement learning; and using, by the device, the second large language model to correct an error of the first large language model.

20 Claims, 5 Drawing Sheets

(56)        References Cited

OTHER PUBLICATIONS

Jain A., et al., "Tuning Models of Code with Compiler-Generated Reinforcement Learning Feedback", arXiv:2305.18341v1 [cs.PL], May 25, 2023, pp. 1-19.
Pan L., et al., "LOGIC-LM: Empowering Large Language Models with Symbolic Solvers for Faithful Logical Reasoning", arXiv:2305.12295v1 [cs.CL], May 20, 2023, 15 Pages.

* cited by examiner

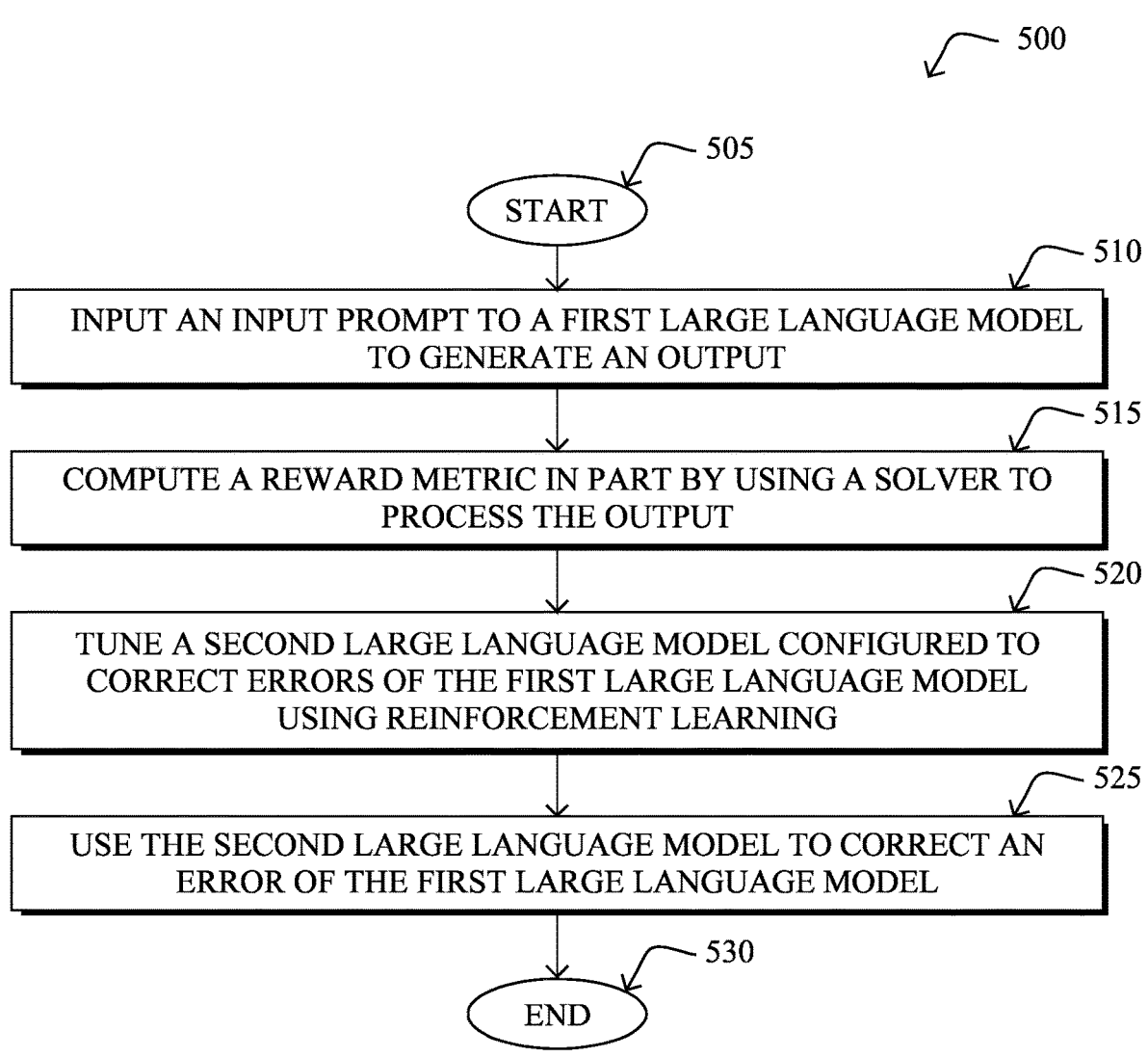

500

505

START

510

INPUT AN INPUT PROMPT TO A FIRST LARGE LANGUAGE MODEL TO GENERATE AN OUTPUT

515

COMPUTE A REWARD METRIC IN PART BY USING A SOLVER TO PROCESS THE OUTPUT

520

TUNE A SECOND LARGE LANGUAGE MODEL CONFIGURED TO CORRECT ERRORS OF THE FIRST LARGE LANGUAGE MODEL USING REINFORCEMENT LEARNING

525

USE THE SECOND LARGE LANGUAGE MODEL TO CORRECT AN ERROR OF THE FIRST LARGE LANGUAGE MODEL

530

END

FIG. 5

STRUCTURED QUERY LANGUAGE GENERATION USING LARGE LANGUAGE MODELS

TECHNICAL FIELD

The present disclosure relates generally to computer systems, and, more particularly, to structured query language generation using large language models.

BACKGROUND

In recent years, the field of artificial intelligence (AI) has enjoyed substantial advancements, particularly in the domain of natural language processing, which has been driven in part by the development of large language models (LLMs). LLMs are a class of powerful AI models that provide very human-like responses. These models are typically built using neural networks, particularly deep learning architectures, and are trained on vast amounts of text data. One of the pioneering architectures in this field is the Transformer, which has been instrumental in the development of many state-of-the-art language models, including LLMs such as ChatGPT, which are powerful question-answering agents that provide meaningful responses to human queries.

At the core of these models lies a complex network of interconnected neurons that process and analyze language patterns. They employ mechanisms to weigh the importance of different words and phrases in the input text, enabling them to understand context, syntax, and semantics. As a result, they can perform a multitude of language-related tasks, such as text generation, translation, summarization, question-answering, sentiment analysis, and more. As a result, LLMs have revolutionized the way machines understand and generate human language, offering a broad spectrum of applications across various industries. However, LLM answers may not always be verifiable and, on some occasions, LLMs may hallucinate.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example simplified procedure for structured query language generation using large language models.

DESCRIPTION OF EXAMPLE EMBODIMENTS

Overview

According to one or more embodiments of the disclosure, techniques are introduced herein that provide structured query language generation using large language models. In particular, the techniques herein may first include inputting, by a device, an input prompt to a first large language model to generate an output. The device may then compute a reward metric by using a solver to process the output.

Tuning of a second large language model configured to correct errors of the first large language model using reinforcement learning may be employed by the device based on the reward metric, and the device may use the second large language model to correct an error of the first large language model.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
FIG. 1 illustrates an example communication network.
Figure 1:
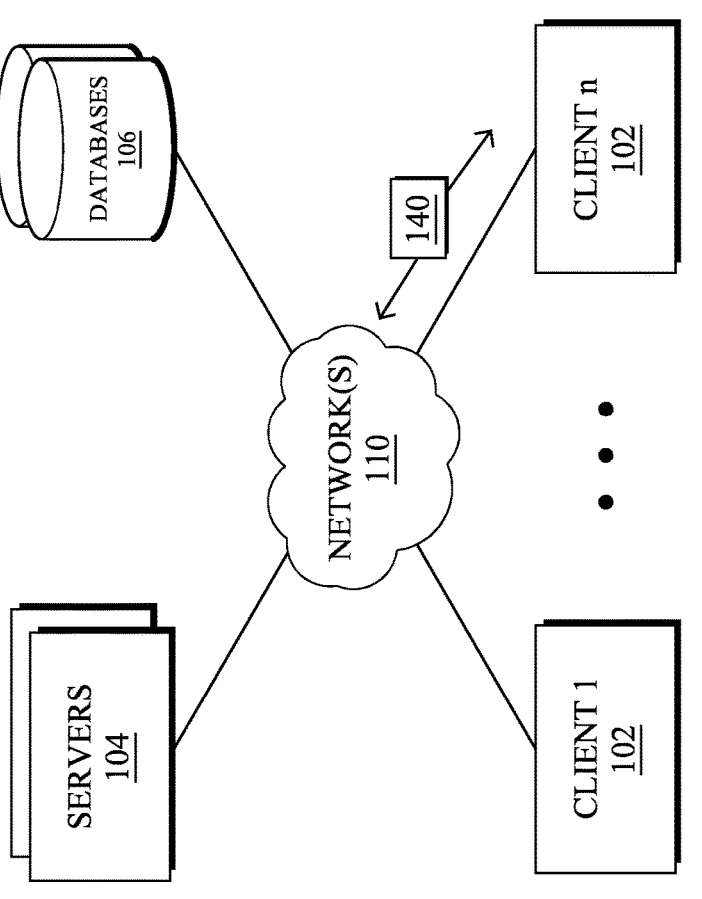

FIG. 1 is a schematic block diagram of an example simplified computing system 100 illustratively comprising any number (e.g., a first through nth) of client devices (e.g., client devices 102), one or more of servers 104, and one or more of databases 106, where the devices may be in communication with one another via any number of networks (e.g., networks 110). The one or more networks (e.g., networks 110) may include, as would be appreciated, any number of specialized networking devices such as routers, switches, access points, etc., interconnected via wired and/or wireless connections. For example, devices 102-104 and/or the intermediary devices in network(s) (e.g., networks 110) may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) (e.g., networks 110).

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
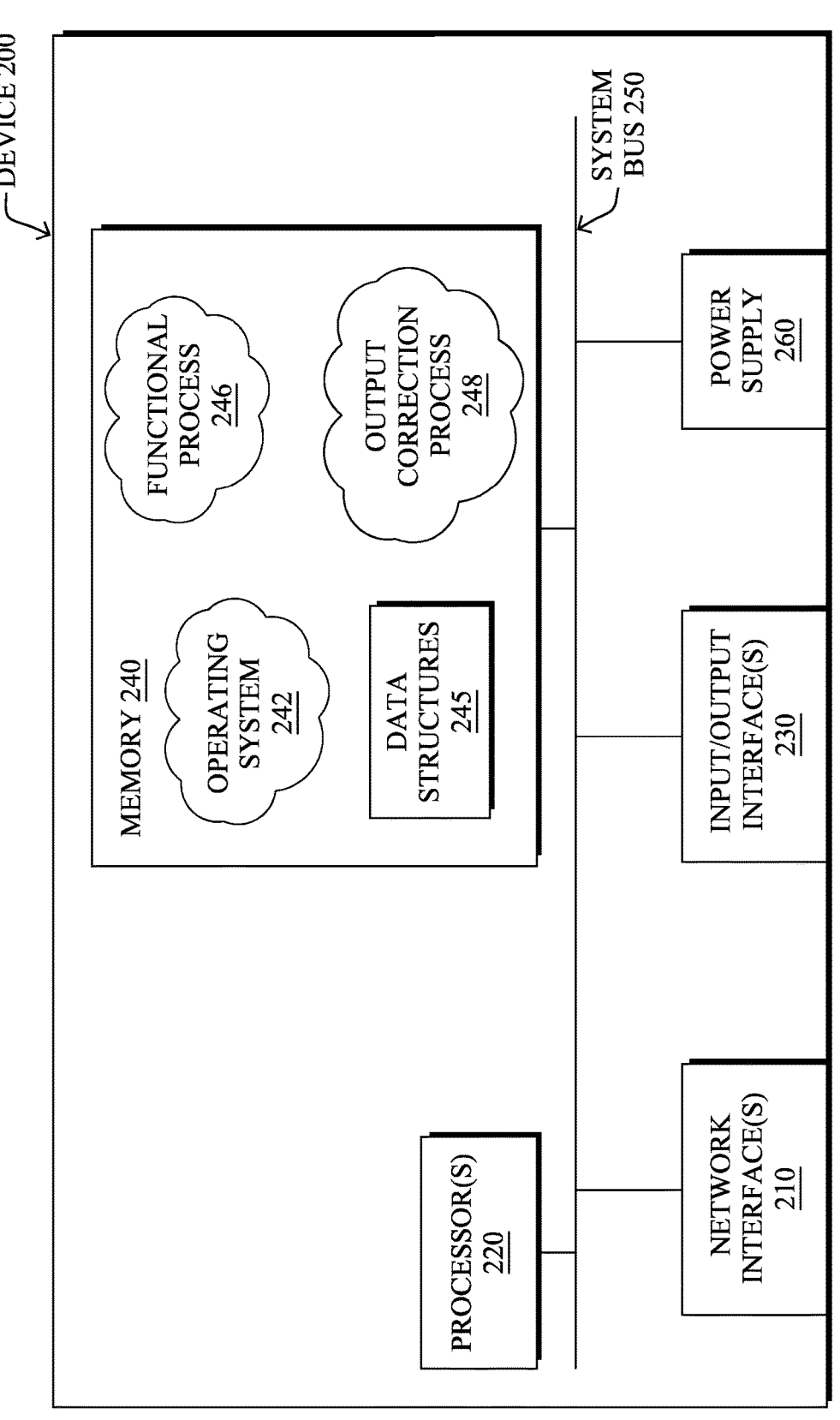
FIG. 2 illustrates an example computing device/node.

FIG. 2 is a schematic block diagram of an example node/device 200 (e.g., apparatus) that may be utilized with one or more implementations described herein, e.g., as any of the devices 102-106 shown in FIG. 1 described above as well as the present disclosure described below. Device 200 may comprise one or more network interfaces (e.g., network interfaces 210) (e.g., wired, wireless, etc.), at least one processor (e.g., processor(s) 220), and a memory 240 interconnected by a system bus 250, as well as a power supply 260 (e.g., battery, plug-in, etc.).

The network interface(s) (e.g., network interfaces 210) contain the mechanical, electrical, and signaling circuitry for communicating data over links coupled to the network(s) (e.g., networks 110). The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the implementations described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more of functional processes 246, and on certain devices, an output correction process 248, as described herein. Notably, functional processes 246, when executed by processor(s) (e.g., processor(s) 220), cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, as detailed further below, output correction process 248 may include computer executable instructions that, when executed by processor(s) 220, cause device 200 to perform the techniques described herein. To do so, in some implementations, output correction process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, output correction process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that output correction process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, output correction process 248 may also include one or more generative artificial intelligence (AI)/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. Example generative approaches can include, but are not limited to, generative adversarial networks (GANs), large language models (LLMs), other transformer models, and the like.

Notably, computer networks or components thereof, such as the nodes, devices, etc. described herein, can perform various tasks utilizing data. In recent years, the amount of data powering different industries, and their systems, has been increasing exponentially. The majority of business information is managed by relational databases that store, process, and retrieve data. Databases power information systems across multiple industries including retail (e.g., orders, cancellations, refunds), supply chain (e.g., raw materials, stocks, vendors), healthcare (e.g., medical records), and finance (e.g., financial business metrics) to name a few. Additionally, databases power customer support mechanisms, Internet search engines and knowledge bases, among others. It is imperative for modern data-driven entities to track, often in real-time, the states of their companies and their businesses in order to quickly understand and diagnose any emerging issues, trends, or anomalies and to take corrective actions in these constantly evolving environments. Currently, the majority of the tracking of these metrics is generally performed manually by analysts and/or computer scientists who interface directly with databases using complex queries in computer languages that invoke queries, such as the Structured Query Language (SQL).

Although simplistic SQL queries that address fundamental metrics are known, generally predefined, and are often incorporated in commercial products, there exist other "non-fundamental" metrics or "follow-up metrics" that generally require manual coding by analysts and/or computer scientists, particularly as the complexity of computer networks and, hence, the metrics that can be derived therefrom, continually increase.

These more complex metrics that generally require manual coding by analysts and/or computer scientists and therefore involve static interactions between database queries and consumption of the corresponding results require time-consuming manual intervention and can result in delays due to the time involved in the manual nature of such interventions. Therefore, it would be vastly more efficient to provide non-technical computer users with the ability to directly interact with these metrics via natural language queries that abstract away the underlying computer code.

Using SQL computer code as an example: defining a SQL query requires a strong understanding of database schema and SQL syntax and can quickly get overwhelming for beginners and non-technical computer users. Efforts to bridge this knowledge gap have led to the development of processing algorithms, one of which that is generally referred to as Natural Language Interface to Database (NLIDB). NLIDB allows users to access database information using natural language inquiries. This natural language database search capability has become more popular over recent years and, as such, companies are developing deep-learning approaches for accessing specific databases using natural language. One such approach is natural language to SQL (NL2SQL). NL2SQL seeks to transform natural language statements, requests, and/or questions to SQL queries so that individuals, including those unfamiliar with SQL, can run unstructured queries against databases. Additionally, the SQL queries can enable digital assistants, such as chatbots, to improve their responses when an answer or response to a query can be found in different databases with different schema.

Users seeking to obtain information about topics of interest from a database tend to interact with these digital assistants conversationally. For example, the user may ask the digital assistant one or more questions pertaining to a topic or topics of interest to the user. For example, the user can start the interaction with a first question pertaining to a first topic of interest and the digital assistant can return a first answer pertaining to the first topic of interest. The user can choose to continue the interaction with a second question pertaining to the first topic of interest, and the digital assistant can return a second answer the pertains to the first topic of interest and so on and so forth. Should the user become bored, the user could also choose to continue the interaction with a second question pertaining to a second topic of interest and the digital assistant can return an answer the pertains to the second topic of interest, and so on and so forth. In general, it has been observed that the user usually continues the interaction with several follow-up questions until the user loses interest and/or obtains a satisfactory answer.

To respond to these interactions, deep-learning models (e.g., natural language to logical form translators or "NL-LF" translators) in these digital assistants can be trained to perform different tasks. For example, one NL-LF translator can be trained to perform a first task that includes interacting with a user about the first topic of interest and another NL-LF translator can be trained to perform a second task that includes interacting with the user about the second topic of interest. However, in order to perform each task well (i.e., provide accurate responses to the questions posed by the user), these deep-learning NL-LF translators are required to be trained with an enormous amount of training data for each task. Conventional approaches have typically ignored this problem and assumed the availability of large training datasets tailored for each task. In most cases, however, such large training datasets do not exist.

In an effort to remedy these shortcomings, some conventional approaches have attempted to manually gather and clean data (e.g., via crowdsourcing, etc.), but gathering and cleaning data is a substantial undertaking that requires a significant amount of time, effort, and money. As a result, due to training data sparsity for each task, NL-LF translator performance for each task suffers. This can be most evidently evidenced by responses to logical and/or reasoning queries that are not factually verifiable, as well as responses to logical and/or reasoning queries that suffer from hallucinations introduced by the digital assistant.

Accordingly, a different approach is needed to address these challenges and others. The approaches described herein transform natural language to SQL based on a multi-pronged or "tiered" processing approach to reducing errors and/or hallucinations in responses from digital assistants. Using a multi-pronged query processing strategy, multiple NL-LF translators and/or large language models (LLMs) can be employed collaboratively to improve responses to queries using less training data.

For example, two LLMs having different characteristics can operate collaboratively to improve results to queries and reduce hallucinations that can be introduced by LLMs when responding to logical and/or reasoning queries. Accordingly, in one or more embodiments, one of the LLMs can be provided with a very powerful LLM that can operate on inference and the other LLM can be a substantially smaller (e.g., less powerful LLM) that can be trained. A logical and/or reasoning query can be translated to first order logic (FOL) by the first LLM and provided to the second LLM, which can be trained and is therefore able to find and fix the errors created in the FOL conversion of the query as performed by the first LLM, as described in more detail herein.

——Structured Query Language Generation Using Large Language Models——

As noted above, various challenges, such as accuracy in responses from LLMs, difficulties in validating the logical and/or reasoning consistency in LLM responses, reliability of LLM responses, and/or hallucinations introduced by LLMs can be associated with using LLMs, particularly for generating computer code responses, such as first order logic (FOL) responses, structured query language (SQL) responses, and the like.

The techniques herein therefore provide for mitigating the above and other issues. For example, by converting queries to FOL or SQL computer code, it is possible to evaluate the logical consistency and/or to audit the reasoning of the LLM(s). However, FOL and SQL computer code generated by LLMs generally have poor performance. Further, training LLMs can be expensive (e.g., in terms of time, computing resources, and/or other resources, such as electricity), can require a large amount of data, and/or may not always be possible (e.g., for LLMs that operate on inference and are therefore untrainable). In order to remedy these issues, a system is disclosed herein that allows for edits to be suggested to outputs of an LLM (e.g., a first LLM that uses inference) using a smaller language model (e.g., a second, smaller, and trainable LLM). These edits can then be used by the LLM to correct or otherwise mitigate errors in the output of the LLM to generate FOL or SQL translations with improved accuracy.

Illustratively, the techniques described herein may be performed by hardware, software, and/or firmware, such as in accordance with output correction process 248, which may include computer executable instructions executed by the processor(s) 220 (or independent processor of network interfaces 210) to perform functions relating to the techniques described herein.

Specifically, according to various embodiments, an illustrative method herein may comprise: inputting, by a device, an input prompt to a first large language model to generate an output; computing, by the device, a reward metric in part by using a solver to process the output; tuning, by the device and based on the reward metric, a second large language model configured to correct errors of the first large language model using reinforcement learning; and using, by the device, the second large language model to correct an error of the first large language model.

Figure 3:
FIG. 3 illustrates an example flow for structured query language generation using large language models.
Figure 3:
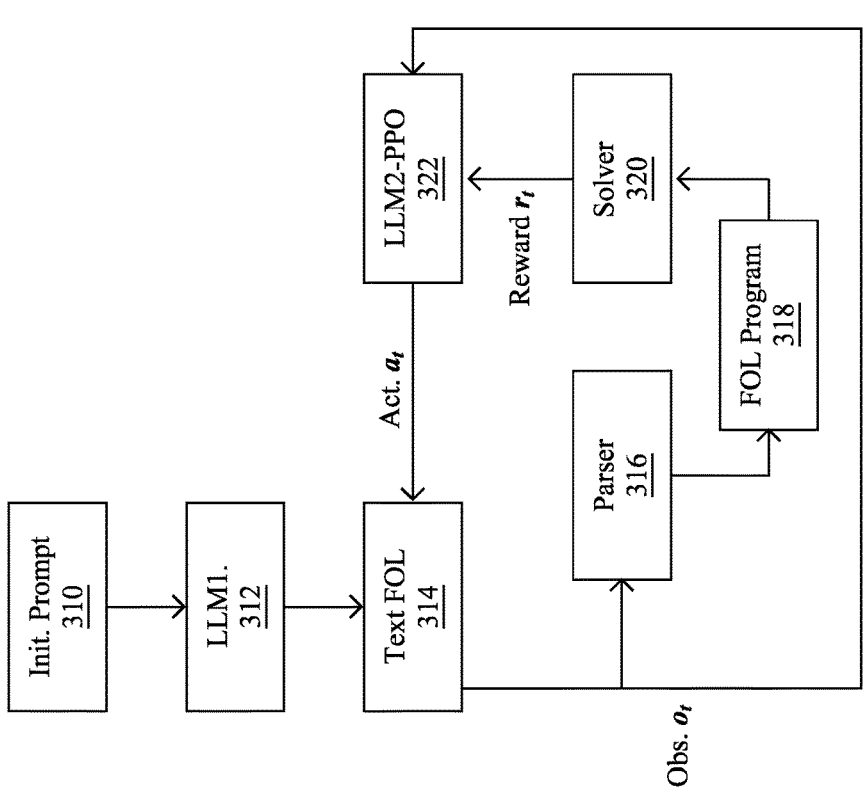

Operationally and according to various embodiments, FIG. 3 illustrates an example flow 300 for structured query language (SQL) generation using large language models (LLMs). As mentioned above, to address the problem of verification of the LLMs responses to logical and reasoning queries, a system that includes two LLMs (e.g., the LLM 312 and the LLM 322) that work in collaboration is proposed. In such embodiments, the LLM 312 can be a powerful LLM that can only be used in inference mode and the LLM 322 can be a cheaper and smaller LLM that can be trained.

As discussed in more detail below, the LLM 312 can be used to convert facts from an initial prompt 310 (e.g., a "query") into first order logic (FOL), such as the FOL 314. However, as mentioned above, current state of the art LLMs, even LLMs such as ChatGPT, are generally not able to produce a flawless first order logic translation of the query. Accordingly, as shown in FIG. 3, the LLM 312, in response to receipt of the initial prompt 310, generates the FOL 314 and/or a first draft of a FOL program 318 that corresponds to a logical query associated with the initial prompt 310.

In some embodiments, the FOL program 318 can be converted and compared to a ground truth during a training phase performed by the LLM 322. The LLM 322 can perform one or more actions to fix errors in the conversion of the FOL program 318. The modified query (e.g., the FOL 314 and/or the FOL program 318) can be evaluated with a solver 320 (e.g., a Boolean satisfiability solver, a reasoner tool, etc.) to obtain a reward function. The reward function can then be used to train the LLM 322. In some embodiments, the LLM 322 can be trained using a reinforcement algorithm (e.g., a proximal policy optimization (PPO) algorithm), although embodiments are not limited to this particular example reinforcement algorithm.

In some embodiments, the processes described herein can be automated. For example, the processes of the structured query language generation using large language models of the disclosure can be performed automatically in response to receipt of the initial prompt 310 (e.g., in the absence of further user interaction or commands once the initial prompt 310 has been provided). This can allow for creation of enough training data for the LLM 322 to allow the LLM 322 to be adequately trained to find and mitigate the errors created in the conversion to FOL generated as an initial output of the LLM 312 without requiring an overabundance of training data (e.g., without requiring an amount of data on par with the data associated with the LLM 312).

In this manner, the systems described herein (e.g., systems that include two LLMs configured to behave in accordance with the disclosure) to find and mitigate FOL errors in a minimum amount of steps during inference, and at a low cost, particularly in terms of time and computing resources. In addition, the systems described herein can evaluate the or falsity of the initial prompt 310 using virtually any solver, such as a Boolean satisfiability solver, or a reasoner tool, etc.

In the non-limiting example of FIG. 3, an initial prompt 310 is generated. The initial prompt 310 may be a query generated by a user of a computing device and submitted to a digital assistant (e.g., a bot, chat program, etc.) with the expectation that the digital assistant will provide a response based after the initial prompt is processed by an LLM. Continuing with this non-limiting example, the LLM 312 receives the initial prompt 310 and generates the FOL 314.

The FOL 314 can be parsed using, for example, parser 316 to generate a FOL program 318. In some embodiments, the parser 316 can be configured to parse a query, such as the initial prompt 310 into a string field. Further, the parser 316 may, in some embodiments, ensure that the syntax of the FOL 314 is correct. The FOL program 318 can be processed by a solver 320 to generate a reward function, $r_\tau$. The reward function is then provided to the LLM 322, which uses the reward function to perform reinforcement training. In addition to, or in the alternative, the FOL 314 can be directly provided to the LLM 322 as an input $o_\tau$, which can be process in addition to, or in the alternative to, the reward function by the LLM 322.

Once the reinforcement training is complete, the LLM 322 can provide an output, $a_\tau$, to the LLM 312. In general, the output, $a_\tau$, exhibits fewer errors than the input $o_\tau$ as a result of the processing by the LLM 322.

Figure 4:
FIG. 4 illustrates another example flow for structured query language generation using large language models.
Figure 4:
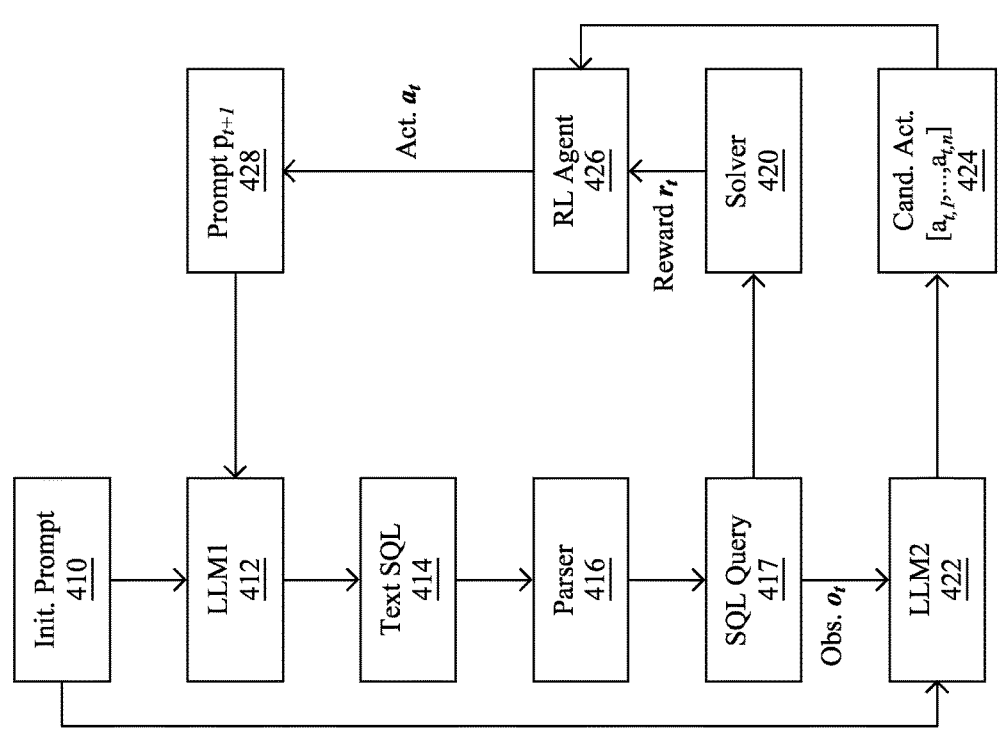

FIG. 4 illustrates another example flow 400 for structured query language generation using large language models. As mentioned above, LLMS, such as ChatGPT, have proven quite capable of generating complex textual outputs and, in some instances, are capable of generating computer code. Structured query language (SQL) is one example of code that some LLMs are able to generate. In general, SQL is the query language used to retrieve data from most databases. Converting natural language inputs into SQL code is not without challenges, however. Indeed, even the most capable state of the art LLMs can be prone to errors when converting natural language to computer code, such as SQL. Accordingly, embodiments herein provide solutions to improving the accuracy of natural language to computer code conversions.

As shown in FIG. 4, an initial prompt 410 is generated. In some embodiments, the initial prompt 410 can be analogous to the initial prompt 310 of FIG. 3. Accordingly, the initial prompt 410 can be generated by a user in, for example, natural language. The initial prompt 410 is received by an LLM 412. The LLM 412 can be analogous to the LLM 312 of FIG. 3. Accordingly, the LLM 412 can be a large, powerful LLM that is configured to perform inference operations.

In the non-limiting example illustrated in FIG. 4, the LLM 412 can generate SQL computer code 414 based on the initial prompt 410. This SQL computer code 414 can be parsed by, for example a parser 416. The parser 416 can be analogous to the parser 316 of FIG. 3 and can be, for example, an SQL parser or other similar parsing tool that is configured to parse an SQL query into a string field. Further, in some embodiments, the parser 416 can ensure that the syntax of the SQL computer code 414 is correct prior to subsequent processing.

The (parsed) SQL computer code 414 can then be converted into a SQL query 417. As shown in FIG. 4, the SQL query 417 can be provided as an input or to the LLM 422 and can be provided to the solver 420. The solver 420 can be analogous to the solver 320 of FIG. 3. Accordingly, the solver 420 can be a Boolean satisfiability solver, a reasoner tool, etc.

The solver 420 can generate a reward function, $r_\tau$, which can be provided to a reinforcement learning agent 426. In addition, the LLM 422 can generate one or more candidate outputs 424 (e.g., $[a_{\tau,1}, \ldots, a_{\tau,n}]$) that are provided to the reinforcement learning agent 426. In some embodiments, the reinforcement learning agent 426 can execute a proximal policy optimization (PPO) algorithm, although embodiments are not limited to this particular example reinforcement algorithm.

An output, $a_\tau$, is then generated as a second prompt 428 (i.e., the prompt $P_{\tau+1}$) which is then provided to the LLM 412. As discussed above, in general, the output, $a_\tau$, exhibits fewer errors than the input, $o_\tau$, as a result of the processing by the LLM 422, the solver 420, and/or the reinforcement learning agent 426.

In a non-limiting example, the LLM 412 is a large, powerful LLM that solely performs inference while the LLM 422 is smaller LLM that is fine-tunable and trained to generate suggestions to improve data that is generated as a result of the initial prompt 410, such as the SQL computer code 414. As mentioned above, the initial prompt 410 can be a natural language query, such as "show me the list of employees with income greater than X sorted by years of service."

Continuing with the non-limiting example of FIG. 4, the second prompt 428, can include one or more suggestions for edit(s) to be made to the SQL computer code 414. Some simplistic examples of the type of edit(s) that could be included in the second prompt 428 include corrections to the SQL computer code 414 that may have been introduced by the LLM 412, such as "wrong table used," "incorrect order," etc., although it will be appreciated that other edit(s) and/or suggested corrections that are more (or less) complicated can be provided in the second prompt 428.

In some embodiments, the LLM 422 can be trained in a supervised training approach using synthetic data, for example, by utilizing a supervised fine-tuning (SFT) methodology, although other training techniques are contemplated within the scope of the disclosure. The LLM 422 can be further trained and/or fine-tuned in conjunction with the LLM 412 using a reinforcement learning approach, as discussed above.

Continuing with this non-limiting example, embodiments of the disclosure may utilize a limited quantity of natural language, SQL pairs that can be used for the supervised fine-tuning phases of the LLM 422 and/or for generation of the synthetic data used for initially training the LLM 422. As mentioned above, this data set may be small (in comparison to datasets used in conjunction with the LLM 412). In addition, the LLM 422 may not be powerful enough (i.e., because the LLM 422 is not as powerful as the LLM 412) to directly optimize for direct natural language to SQL (or other machine language) generation.

In some embodiments, the LLM 422 can be initially trained using these supervised fine-tuning phases via injection of synthetic perturbations. For example, for each natural language, SQL pair in a data set used to initially train the LLM 422, a set of predefined perturbations can be generated and then used to train the LLM 422 to classify the perturbations. It is noted that this is a substantially easier task to perform, particularly by an LLM 422 that is smaller and/or less powerful than, for example, the LLM 412 than direct generation of SQL computer code from natural language.

Some non-limiting examples of predefined perturbations that can generated and injected into the LLM 422 during this initial training phase can include simple alterations, such as "change table name," "change order" (e.g., from ascending to descending or vice versa), "syntax error(s)," and/or "operator reordering," among others, although it will be appreciated that other alteration(s) that are more (or less) complicated can be provided in to the LLM 422 during the initial training phase.

Once the initial training phase(s) is/are performed using the LLM 422, in some embodiments, the LLM 422 can be trained during performance of the operations described above to generate edit(s) to actual data provided thereto. For example, in second (e.g., real-time) training phase(s), the LLM 422 can be trained using a "triple" that includes the natural language query, SQL queries (e.g., the SQL query 417), and a perturbed SQL query that is generated based on the initial training phase(s) discussed above.

FIG. 5 illustrates an example simplified procedure for structured query language generation using large language models. For example, a non-generic, specifically configured device (e.g., device 200, or other apparatus) may perform procedure 500 (e.g., a method or process) by executing stored instructions (e.g., output correction process 248). Alternatively, a tangible, non-transitory, computer-readable medium may have computer-executable instructions stored thereon that, when executed by a processor on a computer, cause the computer to perform a method according to procedure 500.

Procedure 500 may start at step 505, and continues to step 510, where, as described in greater detail above, a device (e.g., the device 200) inputs and/or receives an input prompt (e.g., the initial prompt 310 of FIG. 3 and/or the initial prompt 410 of FIG. 4) to a first large language model to generate an output. The first large language model may be analogous to the LLM 312 and/or the LLM 412 of FIG. 3 and FIG. 4, herein.

In some embodiments, the device can translate the input prompt from natural language to a computer code language, such as a structured query language format, a first order logic format, or other computer language format. That is, the device can translate the input prompt to a format chosen from a group consisting of a structured query language format, a first order logic format, or any other suitable format.

At step 515, as detailed above, the device computes a reward metric in part by using a solver to process the output. The reward metric can be analogous to the reward function $(r_\tau)$ described above in connection with FIG. 3 and FIG. 4, above, while the solver can be analogous to the solver 320 of FIG. 3 and/or the solver 420 of FIG. 4. In some embodiments, the solver can be a Boolean satisfiability solver, a reasoner tool, or other solver, as described above. That is, the solver can be chosen from a group consisting of a Boolean satisfiability solver, a reasoner tool, or any other suitable solver tool.

At step 520, as detailed above, the device tunes a second large language model configured to correct errors of the first large language model using reinforcement learning. In some embodiments, the device tunes a second large language model configured to correct errors of the first large language model using reinforcement learning based on the reward metric. The second large language model may be analogous to the LLM 322 and/or the LLM 422 of FIG. 3 and FIG. 4, herein.

At step 525, as detailed above, the device can use the second large language model to correct an error of the first large language model. In some embodiments, the device can generate, as part of correcting the error of the first large language model, the reward metric. In addition to, or in the alternative, the device can train the second large language model using the reward metric.

In some embodiments, the second large language model can generate an output and provide the output to the first large language model. This output can be generated as part of processes to correct the error(s) associated with the first large language model, as detailed above. Such an output can include one or more corrections (e.g., edits) to the FOL 314, the FOL program 318, the SQL computer code 414, and/or the SQL query 417, as detailed above. Accordingly, the output can be analogous to the output $(a_\tau)$ described in connection with FIG. 3, the output $(a_\tau)$ described in connection with FIG. 4, and/or the second prompt 428 (the prompt $P_{\tau+1}$) described in connection with FIG. 4.

The output can be compared to a ground truth as part of correcting the errors in the first large language model, as discussed above. Further, in some embodiments, the error(s) of the first large language model can be corrected automatically in response to receipt of the input prompt by the device. That is, error(s) introduced by the first large language model when converting a natural language query into computer language, such as SQL, FOL, etc., can be corrected in an automated manner without further input from a user of the large language model(s) besides the initial prompt.

In some embodiments, the second large language model can generate a second prompt (e.g., the prompt $P_{\tau+1}$) corresponding to a second output that includes a correction to an error of the first large language model. The second prompt can be provided to the first large language model, as described in connection with FIG. 3 and FIG. 4, herein.

As described above, in some embodiments, the first large language model can be larger than the second large language model. That is, the first large language model can be a more powerful large language model and can therefore be previously trained on larger data sets than the second large language model. As a result, in some embodiments, the first large language model can be configured to perform inference (due to the size and/or power of the first large language model) while the second large language model can be trained automatically, e.g., during performance of the operations described herein.

In some embodiments, the procedure 500 can include performing initial training on the second large language model, wherein the initial training comprises supervised finetuning via synthetic perturbations using synthetic data and performing subsequent training on the second large language model, wherein the subsequent training comprises finetuning using a reinforcement learning algorithm, as discussed in connection with FIG. 3 and FIG. 4, herein.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein therefore provide for improving accuracy in responses from LLMs, validating the logical and/or reasoning consistency in LLM responses, and/or mitigating hallucinations introduced by LLMs, particularly in the context of generating structured query language responses using LLMs. For example, through utilization of the techniques described herein, the accuracy of natural language to computer code conversions may be improved in a manner that minimizes the costs (e.g., monetary, timewise, resource, etc.) that may generally be associated therewith.

While there have been shown and described illustrative embodiments that provide for structured query language generation using large language models, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of scripting languages and common data formats are discussed herein, the techniques herein may be used in conjunction with any scripting language or common data format.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

inputting, by a device, an input prompt to a first large language model to generate an output;

computing, by the device, a reward metric in part by using a solver that processes the output against a formal specification or database schema to determine whether the output is false or unsatisfiable with respect to the formal specification or database schema;

using, by the device, a second large language model to correct an error of the first large language model; and tuning, by the device and iteratively based on the reward metric, the second large language model using reinforcement learning, wherein the solver is a logical solver separate from the first large language model and the second large language model.

2. The method as in claim 1, wherein the first large language model is larger than the second large language model.

3. The method as in claim 1, wherein the first large language model is configured to perform inference, and wherein the second large language model is configured to be trainable.

4. The method as in claim 1, further comprising:

translating the input prompt to a format chosen from a group consisting of: a structured query language format; and a first order logic format.

5. The method as in claim 1, further comprising:

performing initial training on the second large language model, wherein the initial training comprises supervised fine-tuning via synthetic perturbations using synthetic data; and performing subsequent training on the second large language model, wherein the subsequent training comprises fine-tuning using a reinforcement learning algorithm.

6. The method as in claim 1, wherein the solver is chosen from a group consisting of:

a Boolean satisfiability solver; and a reasoner tool.

7. The method as in claim 1, further comprising:

generating, as part of correcting the error of the first large language model, the reward metric; and training the second large language model using the reward metric.

8. The method as in claim 1, further comprising:

comparing the output to a ground truth as part of correcting the error of the first large language model.

9. The method as in claim 1, further comprising:

correcting the error of the first large language model automatically in response to generating the output.

10. The method as in claim 1, further comprising:

generating, by the second large language model and as part of correcting the error of the first large language model, a second prompt corresponding to a second output that includes a correction to an error of the first large language model; and providing the second prompt to the first large language model.

11. An apparatus, comprising:

one or more network interfaces to communicate with a network;

a processor coupled to the one or more network interfaces and configured to execute one or more processes; and a memory configured to store a process that is executable by the processor, the process, when executed, configured to:

input an input prompt to a first large language model to generate an output;

compute a reward metric in part by using a solver that processes the output against a formal specification or database schema to determine whether the output is false or unsatisfiable with respect to the formal specification or database schema;

use a second large e model to correct an error of the first large language model; and tune, iteratively based on the reward metric, the second large language model using reinforcement learning, wherein the solver is a logical solver separate from the first large language model and the second large language model.

12. The apparatus as in claim 11, wherein the first large language model is larger than the second large language model.

13. The apparatus as in claim 11, wherein the first large language model is configured to perform inference, and wherein the second large language model is configured to be trainable.

14. The apparatus as in claim 11, further comprising:

performing initial training on the second large language model, wherein the initial training comprises supervised fine-tuning via synthetic perturbations using synthetic data; and performing subsequent training on the second large language model, wherein the subsequent training comprises fine-tuning using a reinforcement learning algorithm.

15. The apparatus as in claim 11, wherein the solver is chosen from a group consisting of: a Boolean satisfiability solver; and a reasoner tool.

16. The apparatus as in claim 11, further comprising:

generating, as part of correcting the error of the first large language model, the reward metric; and training the second large language model using the reward metric.

17. The apparatus as in claim 11, further comprising:

correcting the error of the first large language model automatically in response to generating the output.

18. The apparatus as in claim 11, further comprising:

generating, by the second large language model and as part of correcting the error of the first large language model, a second prompt corresponding to a second output correct an error of the first large language model a resultant corrected output; and providing the second prompt to the first large language model.

19. A tangible, non-transitory, computer-readable medium having computer-executable instructions stored thereon that, when executed by a processor on a computer, cause the computer to perform a method comprising:

inputting, by a device, an input prompt to a first large language model to generate an output;

computing, by the device, a reward metric in part by using a solver that processes the output against a formal specification or database schema to determine whether the output is false or unsatisfiable with respect to the formal specification or database schema;

using, by the device, a second large language model to correct an error of the first large language model; and tuning, by the device and iteratively based on the reward metric, the second large language model using reinforcement learning, wherein the solver is a logical solver separate from the first large language model and the second large language model.

20. The tangible, non-transitory, computer-readable medium as in claim 19, wherein:

the first large language model is larger than the second large language model, the first large language model is configured to perform inference, and the second large language model is configured to be trainable.

\* \* \* \* \*